(12) United States Patent
Chrobak et al.

(10) Patent No.: US 12,051,231 B2
(45) Date of Patent: Jul. 30, 2024

(54) ANALYSIS AND SORTING IN AQUACULTURE

(71) Applicant: X Development LLC, Mountain View, CA (US)

(72) Inventors: Laura Chrobak, Menlo Park, CA (US); Barnaby John James, Campbell, CA (US)

(73) Assignee: X Development LLC, Mountain View, CA (US)

( * ) Notice: Subject to any disclaimer, the term of this patent is extended or adjusted under 35 U.S.C. 154(b) by 200 days.

(21) Appl. No.: 17/525,131

(22) Filed: Nov. 12, 2021

(65) Prior Publication Data

US 2022/0071180 A1 Mar. 10, 2022

Related U.S. Application Data

(63) Continuation of application No. 16/885,646, filed on May 28, 2020, now Pat. No. 11,688,154.

(51) Int. Cl.
*G06V 10/42* (2022.01)
*A01K 61/95* (2017.01)
(Continued)

(52) U.S. Cl.
CPC .............. *G06V 10/42* (2022.01); *A01K 61/95* (2017.01); *G06F 18/2185* (2023.01);
(Continued)

(58) Field of Classification Search
CPC ...................................... A01K 61/09
(Continued)

(56) References Cited

U.S. PATENT DOCUMENTS 4,963,035 A 10/1990 McCarthy et al.
9,245,337 B2 1/2016 Schmidt et al.
(Continued)

FOREIGN PATENT DOCUMENTS

CA 2785925 10/2019
CL 2019000039 A1 3/2019
(Continued)

OTHER PUBLICATIONS

Extended Search Report in European Appln. No. 22151132.2, dated May 2, 2022, 10 pages.
(Continued)

*Primary Examiner* — Amir Shahnami
(74) *Attorney, Agent, or Firm* — Fish & Richardson P.C.

(57) ABSTRACT

Methods, systems, and apparatus, including computer programs encoded on computer-storage media, for sorting fish in aquaculture. In some implementations, one or more images are obtained of a particular fish within a population of fish. Based on the one or more images of the fish, a data element is determined. The data element can include a first value that reflects a physical characteristic of the particular fish, and a second value that reflects a condition factor of the particular fish. Based on the data element, the fish is classified as a member of a particular subpopulation of the population of fish. An actuator of an automated fish sorter is controlled based on classifying the particular fish as a member of the particular subpopulation of the population of fish.

20 Claims, 5 Drawing Sheets

(51) Int. Cl.

| | |
|---|---|
| *G06F 18/21* | (2023.01) |
| *G06F 18/23213* | (2023.01) |
| *G06F 18/2433* | (2023.01) |
| *G06T 7/00* | (2017.01) |
| *G06T 7/62* | (2017.01) |
| *G06T 7/70* | (2017.01) |
| *G06V 20/05* | (2022.01) |
| *G06V 40/10* | (2022.01) |

(52) U.S. Cl.
CPC .... *G06F 18/23213* (2023.01); *G06F 18/2433* (2023.01); *G06T 7/0012* (2013.01); *G06T 7/62* (2017.01); *G06T 7/70* (2017.01); *G06V 20/05* (2022.01); *G06V 40/10* (2022.01); *G06T 2207/20081* (2013.01); *G06T 2207/20084* (2013.01)

(58) Field of Classification Search
USPC ........................................................ 119/216
See application file for complete search history.

(56) References Cited

U.S. PATENT DOCUMENTS

| | | | |
|---|---|---|---|
| 10,856,520 | B1 | 12/2020 | Kozachenok et al. |
| 2017/0150701 | A1 | 6/2017 | Gilmore et al. |
| 2017/0202185 | A1 | 7/2017 | Trumbull et al. |
| 2019/0228218 | A1* | 7/2019 | James ................ G06T 7/62 |
| 2019/0340440 | A1 | 11/2019 | Atwater et al. |
| 2020/0107524 | A1 | 4/2020 | Messana et al. |
| 2020/0113158 | A1* | 4/2020 | Rishi ................ G06N 3/04 |
| 2020/0155882 | A1 | 5/2020 | Tohidi et al. |
| 2020/0170227 | A1 | 6/2020 | Rishi et al. |
| 2020/0288678 | A1 | 9/2020 | Howe et al. |
| 2021/0321593 | A1* | 10/2021 | Ma ................ G06V 40/103 |

FOREIGN PATENT DOCUMENTS

| | | |
|---|---|---|
| CN | 108040948 | 5/2018 |
| CN | 110125025 | 8/2019 |
| EP | 2244934 | 11/2010 |
| EP | 3484283 | 5/2019 |
| JP | 2000116314 A | 4/2000 |
| JP | 2000131022 | 5/2000 |
| JP | 2002171853 | 6/2002 |
| JP | 6401411 | 10/2018 |
| JP | 2021018448 | 2/2021 |
| JP | 2022086075 | 6/2022 |
| KR | 20180078186 | 7/2018 |
| NO | 300401 | 5/1997 |
| NO | 20160199 | 8/2017 |
| NO | 345829 | 10/2019 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018/011744 | 1/2018 |
| WO | WO2018011745 | 1/2018 |
| WO | WO 2019/002881 | 1/2019 |
| WO | WO 2019/121851 | 6/2019 |
| WO | WO 2019/154840 | 8/2019 |
| WO | WO 2019/188506 | 10/2019 |
| WO | WO 2019/232247 | 12/2019 |
| WO | WO 2020/023467 | 1/2020 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2021/023097, dated Dec. 8, 2022, 9 pages.
[No Author Listed], "2020 The State of World Fisheries and Aquaculture," Food and Agriculture Organization of the United Nations, 2020, 224 pages.
Aunsmo et al., "Accuracy and precision of harvest stock estimation in Atlantic salmon farming," Aquaculture, Mar. 2013, 369(399):113-118.
Aunsmo et al., "Field validation of growth models used in Atlantic salmon farming," Aquaculture, Mar. 2014, 428(429):249-257.
Boldt et al., "Development of stereo camera methodologies to improve pelagic fish biomass estimates and inform ecosystem management in marine waters," Fisheries Research, 2018, 198:66-77.
Costello et al., "The future of food from the sea," Nature, Dec. 2020, 588:95-100.
Crippa et al., "Food systems are responsible for a third of global anthropogenic GHG emissions," Nature Food, Mar. 2021, 2:198-209.
Fore et al., "Precision fish farming: A new framework to improve production in aquaculture," Biosystems Engineering, Nov. 2017, 173:176-193.
Fry et al., "Feed conversion efficiency in aquaculture: do we measure it correctly?," Environ. Res. Lett., Feb. 2018, 13:024017.
Harvey et al., "The accuracy and precision of underwater measurements of length and maximum body depth of southern bluefin tuna (*Thunnus maccoyii*) with a stereo-video camera system," Fisheries Research, Sep. 2003, 63(3):315-326.
Hilborn et al., "The environmental cost of animal source foods," Front Ecol Environ, 2018, 16(6):329-335.
Hockaday et al., "Using truss networks to estimate the biomass of Oreochromis niloticus, and to investigate shape characteristics," Journal of Fish Biology, May 2000, 57:981-1000.
Kang et al., "A Study on the Search of Optimal Aquaculture farm condition based on Machine Learning," The Journal of The Institute of Internet, Broadcasting and Communication, Apr. 2017, 17(2):135-140.
Macleod et al., "Quantifying and mitigating greenhouse gas emissions from global aquaculture," FAO Fisheries and Aquaculture Technical Paper, Mar. 2019, 626:50 pages.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Murray et al., "Using the H-index to assess disease priorities for salmon aquaculture," Preventive Veterinary Medicine, Apr. 2016, 126:199-207.
Odey, "AquaMesh—Design and Implementation of Smart Wireless Mesh Sensor Networks for Aquaculture," American Journal of Networks and Communications, Jul. 2013, 8 pages.
Parker et al., "Fuel use and greenhouse gas emissions of world fisheries," Nature Climate Change, Apr. 2018, 8:333-337.
PCT International Search Report and Written Opinion in Appln. No. PCT/US2020/066820, dated Apr. 30, 2021, 15 pages.
PCT International Search Report and Written Opinion in Appln. No. PCT/US2021/023097, dated Jun. 4, 2021, 45 pages.
Pérez et al., "Automatic measurement of fish size using stereo vision," 2018 IEEE International Instrumentation and Measurement Technology Conference, May 2018, 6 pages.
Petrov et al., "Overview of the application of computer vision technology in fish farming," E3S Web of Conferences, 2020, 175:02015.
Pettersen et al., "Detection and classification of lepeophterius salmonis (krøyer, 1837) using underwater hyperspectral imaging," Aquacultural Engineering, Nov. 2019, 87:102025.
Qiu et al., "Improving Transfer Learning and Squeeze-and-

(56) References Cited

OTHER PUBLICATIONS

Excitation Networks for Small-Scale Fine-Grained Fish Image Classification," IEEE Access, Dec. 2018, 6(31):78503-78512.

Rahman et al., "Developing an Ensembled Machine Learning Prediction Model for Marine Fish and Aquaculture Production," Sustainability, 2021, 13:9124.

Saberloon et al., "Application of Machine Vision Systems in Aquaculture with Emphasis on Fish: State-of-the-Art and Key Issues," Reviews in Aquaculture, Dec. 2017, 9:369-387.

Shafait et al., "Towards automating underwater measurement of fish length: a comparison of semi-automatic and manual stereovideo measurements," ICES Journal of Marine Science, 2017, 13 pages.

Stein et al., "Consistent melanophore spot patterns allow long-term individual recognition of Atlantic salmon Salmo Salar," Journal of Fish Biology, Nov. 2017, 91(6):1699-1712.

towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Troell et al., "Does aquaculture add resilience to the global food system?," PNAS, Sep. 2014, 111(37):13257-13263.

Wang, "Robust tracking of fish schools using CNN for head identification," Multimedia Tools and Applications, Nov. 2017, 20 pages.

Yang et al., "Deep learning for smart fish farming: applications, opportunities and challenges," Reviews in Aquaculture, 2021, 13(1):66-90.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

International Search Report and Written Opinion in International Appln No. PCT/US2022/023831, dated Jul. 8, 2022, 13 pages.

PCT International Search Report and Written Opinion in International Appln. No. PCT/US2020/059829, dated Feb. 25, 2021, 18 pages.

Jin et al., "Weight-length relationships and Fulton's condition factors of skipjack tuna (*Katsuwonus pelamis*) in the western and central Pacific Ocean," PeerJ, Feb. 12, 2015, 3:e758.

Nash et al., "The Origin of Fulton's Condition Factor—Setting the Record Straight," Essay: Fisheries History, May 2006, 31(5):236-238.

Office Action in Japanese Appln. No. 2022-555984, dated Sep. 26, 2023, 13 pages (with English translation).

Office Action in Japanese Appln. No. 2022-555984, dated Mar. 8, 2024, 9 pages (with English translation).

\* cited by examiner

ANALYSIS AND SORTING IN AQUACULTURE

CROSS-REFERENCE TO RELATED APPLICATION

This is a continuation of U.S. application Ser. No. 16/885,646, filed on May 28, 2020, the disclosure of which is considered part of and is incorporated by reference in the disclosure of this application.

FIELD

This specification generally describes enhanced mechanical fish sorting equipment.

BACKGROUND

A population of farmed fish may include normal, healthy fish that are fit for human consumption, as well as fish that are not suited for human consumption, such as juvenile fish, unhealthy or diseased fish, fish that are heavily infested with parasites, or runts. In the aquaculture context, when a population of fish are harvested, a worker may visually evaluate each harvested fish based on a quick observation, and may manually separate the healthy fish from the unhealthy fish so that only healthy fish are sent to market.

Oftentimes these quick visual observations can result in inaccurate classifications of fish, which may result in some fish being improperly sent to market. At the same time, when classifying thousands or tens of thousands of fish using manual processes, the sorting process can last a long period of time, during which time harvested fish may be kept in suboptimal or stressed conditions, resulting in additional fish losses.

SUMMARY

In some implementations, electronic devices, including computers, imaging devices, and actuating mechanical devices, are used to analyze and sort fish. An imaging device obtains one or more images of a fish that is in water. The one or more images are analyzed by electronic devices such as computers or software algorithms, including machine learning models, to detect the fish. Physical characteristics of the fish are determined and used to compute related values. Physical characteristics can include key points on the body of a fish, the positioning of the fish in three dimensions (3D), truss lengths related to distances between key points on the body of the fish, weight or biomass of the fish, body length among others. The physical characteristics and related values are used to classify and sort the fish into a predefined area. Corresponding data, including data elements corresponding to the fish, is stored in a database and information related to the data element, analysis, or sorting is presented to a user. The presentation of information can be an interactive graphic displaying data related to a population of fish.

Advantageous implementations can include one or more of the following features. For example, a user interface (UI) providing relevant information about a fish population can be generated and sent to a user device. The user interface can be a population graph that uses a physical characteristic and a condition factor as coordinate points for plotting the location of one or more fish within the fish population. In some cases, the physical characteristic can be the weight of the fish and the condition factor can be defined as a function of weight and length of the fish. Subpopulations, based on one or more clusters within the population graph, can then be determined such as runts within a population of fish.

In some implementations, population information is recorded for separate pens of fish. For example, a first pen can be composed of 10 percent outliers. A second pen can be composed of 2 percent outliers. The user can access images of the outliers as well as images of members of the entire population. Statistics on the population's size, weight, geometry, feeding behavior, and movement within the pen can be recorded as data related to the pen, the population, or one or more specific fish associated with the pen or the population. Historical data of a specific fish can also be provided by using fish identification. The historical data may include any information captured during one or more detections of the specific fish including previous locations, physical characteristics, physical changes, growth, or behavior over time among others.

In some implementations, visual data is captured and used to determine characteristics, traits, or other detection data in an automated process. For example, instead of an employee evaluating each fish based on a visual observation performed manually, a computer, or group of computers, can obtain images automatically while a fish is in water. The nature of automatically obtaining images allows this type of system to collect more data within a given period of time. The data can be obtained by using algorithms that can learn and improve. In this way, the data can be more accurate than manual observation approaches. The data can be used to double check previous data or be combined to create larger databases of records or individual data elements or sets related to fish. The larger databases can be used to determine trends, risk factors, or other output associated with the population. This output can be used to automatically manage the population through automated sorting or be sent to a user.

In some implementations, one or more images of a particular fish within a population of fish are obtained. Based on the one or more images of the fish, a data element can be determined that includes a first value that reflects a physical characteristic of the particular fish, and a second value that reflects a condition factor of the particular fish. Based on the data element, the fish can be classified as a member of a particular subpopulation of the population of fish. Based on classifying the particular fish as a member of the particular subpopulation of the population of fish, an actuator of an automated fish sorter can be controlled.

In some implementations, the one or more images of the fish include at least a first image representing a first view of the fish and a second image representing a different, second view of the fish.

In some implementations, at least the first image and the second image are used to determine a three dimensional (3D) pose of the fish.

In some implementations, the condition factor is calculated as a function of one or more weight values associated with the fish and one or more length values associated with the fish.

In some implementations, the data element is determined, in part, by estimating a set of truss lengths corresponding to distances between locations on a body of the fish.

In some implementations, one or more other data elements corresponding to other fish within the population of fish are generated.

In some implementations, classifying the fish as a member of the particular subpopulation includes generating one or more clusters based on the data element of the particular fish and the one or more other data elements corresponding to the other fish within the population of fish.

In some implementations, the actuator controls a flap that selectively opens a particular passage among multiple passages that are associated with the automated fish sorter.

In some implementations, the flap includes holes to reduce force required to actuate the actuator.

In some implementations, a visual representation is generated using the first value of the data element and the second value of the data element as a coordinate pair to represent a data point within a graph associated with the particular fish.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
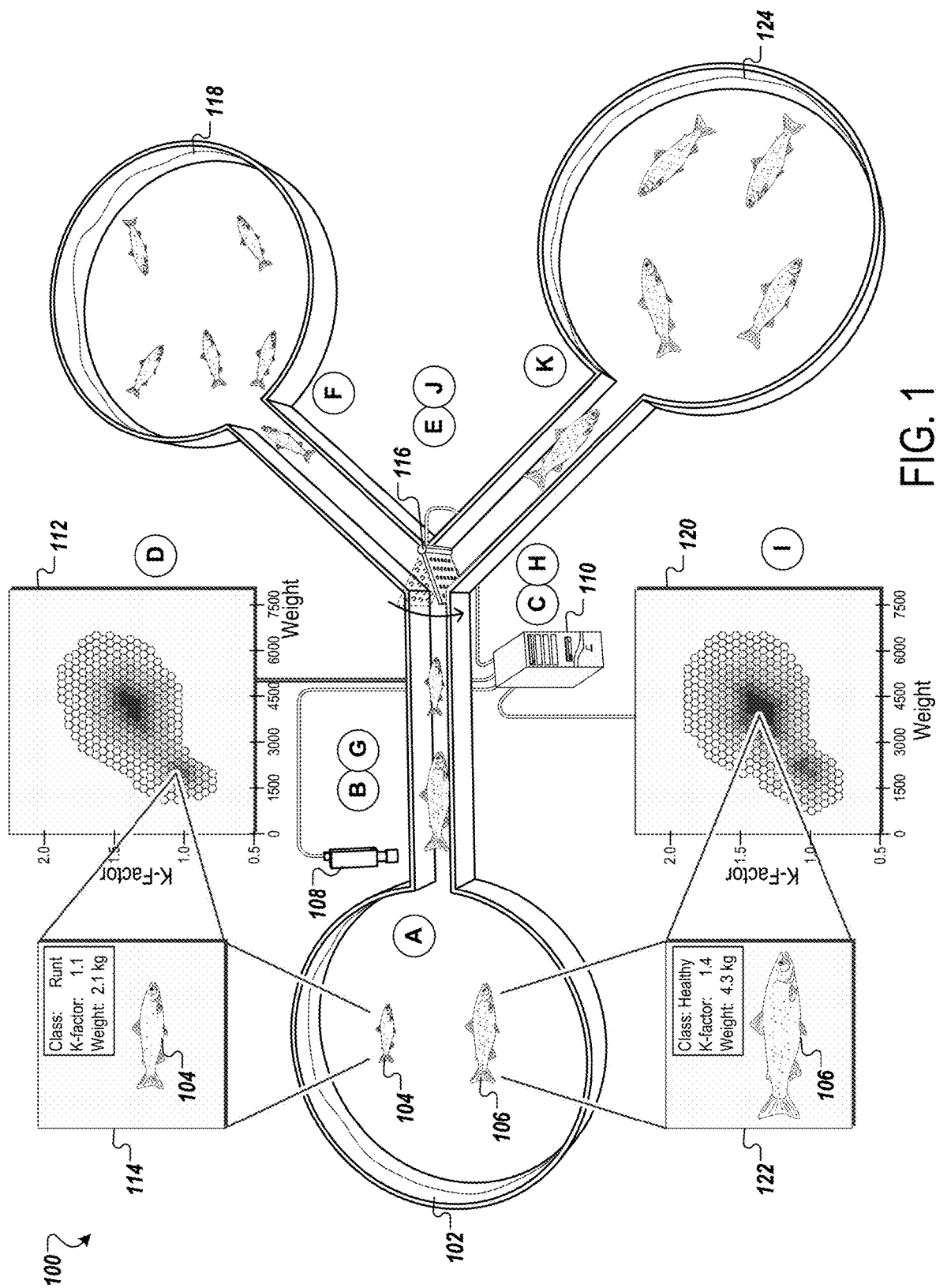
FIG. 1 is a diagram showing an example of a system for analysis and sorting in aquaculture.

FIG. 1 is a diagram showing an example of a system 100 for analysis and sorting in aquaculture. The system 100 includes a first fish pen 102 that contains a runt fish 104 and a healthy fish 106. The first fish pen 102 is connected to a second fish pen 118 that includes a number of smaller fish and a third fish pen 124 that includes a number of larger fish. The system 100, including the three fish pens and the channels connecting the three fish pens, store a sufficient amount of water to enable fish, including the runt fish 104 and the healthy fish 106, to swim freely.

The system 100 further includes a control unit 110 connected to an imaging device 108 and a sorting actuator 116. The sorting actuator 116 controls access to the second fish pen 118 and the third fish pen 124 from the first fish pen 102. The control unit 110 is used to generate population graphs 112 and 120 that show relevant information of a fish population. The fish population shown in population graphs 112 and 120 include the runt fish 104 and the healthy fish 106 among others.

The population graphs 112 and 120 include weight and K-Factor data for fish within the fish population as well as related information including historical data and images of particular fish. Individual points within the population graphs 112 and 120 correspond to individual fish. Additional information related to a fish can be accessed by clicking on a point within the graphic within a given user interface rendered on a computer or other electronic device.

FIG. 1 is shown as a process including stages A through K. Stage A shows the runt fish 104 and the healthy fish 106 within the first fish pen 102. The runt fish 104 swims from the first fish pen 102 to the channel connecting the first fish pen 102 to the third fish pen 118 and the third fish pen 124.

A flow rate of water is adjusted to allow the runt fish 104 into the channel and to progress forwards through the channel in the direction of the second fish pen 118 and the third fish pen 124. In some implementations, other processes are used to control a fishes' movement from one element to another element. For example, an incentive can be placed in the channel connecting the first fish pen 102 to the second fish pen 118. The incentive can be used to control movement of the fish from the first fish pen 102 to the second fish pen 118. In another example, because fish like to swim into a current, a pump, or other current generating sources, may create a current in the channel to entice the fish to swim into the fish channel.

Stage B shows the imaging device 108 obtaining one or more images of the runt fish 104 when the runt fish 104 is in view of the imaging device 108. A motion sensor is used to detect motion of a fish in the channel connecting the first fish pen 102 to the second fish pen 118 and the third fish pen 124. The motion sensor triggers the capturing of one or more images by the imaging device 108. In this case, the motion sensor detects the motion of the runt fish 104 and the imaging device 108 subsequently obtains one or more images of the runt fish 104. The images are sent to the control unit 110.

Stage C shows the control unit 110 receives the one or more images of the runt fish 104. The detailed process of analysis performed by the control unit 110 is described in FIG. 2. Based on analysis performed, the control unit 110 determines physical characteristics corresponding to the runt fish 104. For example, the control unit 110 determines that the runt fish 104 has a weight of 2.1 kilograms (kg) and a length of 12.4 centimeters (cm). Information related to the physical characteristics of each fish within a population of fish is used to generate the population graph 112.

The population graph 112 shows data related to the fish population including the runt fish 104 and the healthy fish 106. Data related to a detection of the runt fish 104 updates a database used to create the population graph 112. The population graph 112 is described in more detail in reference to FIG. 4. Data related to the runt fish 104 is added to an identification profile corresponding to the runt fish 104. Data related to the runt fish 104 can be accessed by a user or other element of the system 100.

Stage D shows an example of a graphical element, the population graph 112, generated by the control unit 110. The x axis of the population graph 112 is weight and the y axis is a K-Factor that is related to physical characteristics of the fish. Points on the graph near the top right represent larger fish while points near the bottom left represent smaller fish. The value of the condition factor may be determined based on any mathematical formula that quantifies the condition of fish. One example of such a condition factor is a K-Factor, which is one typical measure that is used by industry to objectively and quantitatively estimate the condition of an individual fish within a population of fish. While a condition factor alone provides one powerful measure of a fish's health, the condition factor plotted against other values provides an even more powerful tool, e.g., for use in identifying different subpopulations of fish by using clustering techniques. In other implementations, other computed parameters based on determined physical characteristics can be used.

The industry standard condition factor is traditionally computed by physically weighing and measuring the fish, a time-consuming process. One example expression used to compute the condition factor is shown in Equation (1), below:

$$k = \frac{\text{weight [g]}}{\text{length [cm]}^3} \quad (1)$$

In Equation (1), k is the condition factor, weight is a weight of a fish e.g., in grams, and length is a length of the fish, e.g., in centimeters, cubed. By automating the process and using machine learning techniques to determine significant parameters, the system 100 shown in FIG. 1 offers improvements over the traditional approach (e.g., improved accuracy, increased collected data, or increased contextual awareness of outliers within a population, among others).

An image 114 of the runt fish 104 shows example statistics and parameters related to the identification of the runt fish 104. The image 114 can be stored within a graphical element such as the population graph 112 and shown to a user after a selection is made on the particular data entry related to the runt fish 104. As shown in the image 114, the runt fish 104 is classified as "Runt" by the control unit 110 based on the population graph 112 and physical characteristics related to the runt fish 104. The K-Factor is calculated as 1.1 and the weight is determined to be 2.1 kilograms (kg).

A data element corresponding to the runt fish 104 is generated based on the weight of the runt fish 104 (e.g., 2.1 kg) and the condition factor or K-Factor (e.g., 1.1). In this case, the data element is used as a coordinate pair to plot a representation of the runt fish 104 within the population graph 112. One or more previously recorded data elements for other fish can be used to generate the other points within the population graph 112. In some cases, groups of fish can be plotted together within one point.

In stage E, the control unit 110 determines where to sort the runt fish 104 based on a location of the runt fish 104 in the population graph 112, the physical characteristics of the runt fish 104, and predefined sorting criteria. The sorting criteria for the system 100 include sorting fish classified as "Runt" into the second fish pen 118 and sorting fish classified as "Healthy" into the third fish pen 124. The control unit 110 activates the sorting actuator 116 to allow the runt fish 104 to progress into the second fish pen 118. In the example of FIG. 1, the sorting actuator 116 is a motorized element activated by the control unit 110 to swing one way or the other depending upon the sorting criteria.

The sorting actuator 116 is connected to an element with holes. The element with holes is used, in stage E, to block the passage from the first fish pen 102 to the third fish pen 124. The holes can be included to reduce drag when moving the element that blocks passage of the fish. The element attached to the sorting actuator 116 is made of plastic. Similar constructions can be made out of other materials including aluminum, wood, glass, other metals or substances. The holes may be circular or another shape that reduces resistance of motion while not allowing the fish or other animal, to swim through.

The sorting actuator 116 receives a signal from the control unit 110 to close the passage to the third fish pen 124 or to open the passage to the second fish pen 118, depending on implementation. The runt fish 104, unable to swim through to the third fish pen 124, swims through to the second fish pen 118 and is sorted. In stage F, the runt fish 104 joins other similar size fish, classified as "Runt" in the second fish pen 118.

In stage G, the healthy fish 106 moves from the first fish pen 102 to the channel connecting the first fish pen 102 to the second fish pen 118 and the third fish pen 124. The imaging device 108 obtains one or more images of the healthy fish 106. The motion detector used to detect the motion of the runt fish 104 can be used again to detect the motion of the healthy fish 106 as it moves into the view of the imaging device 108.

Figure 2:
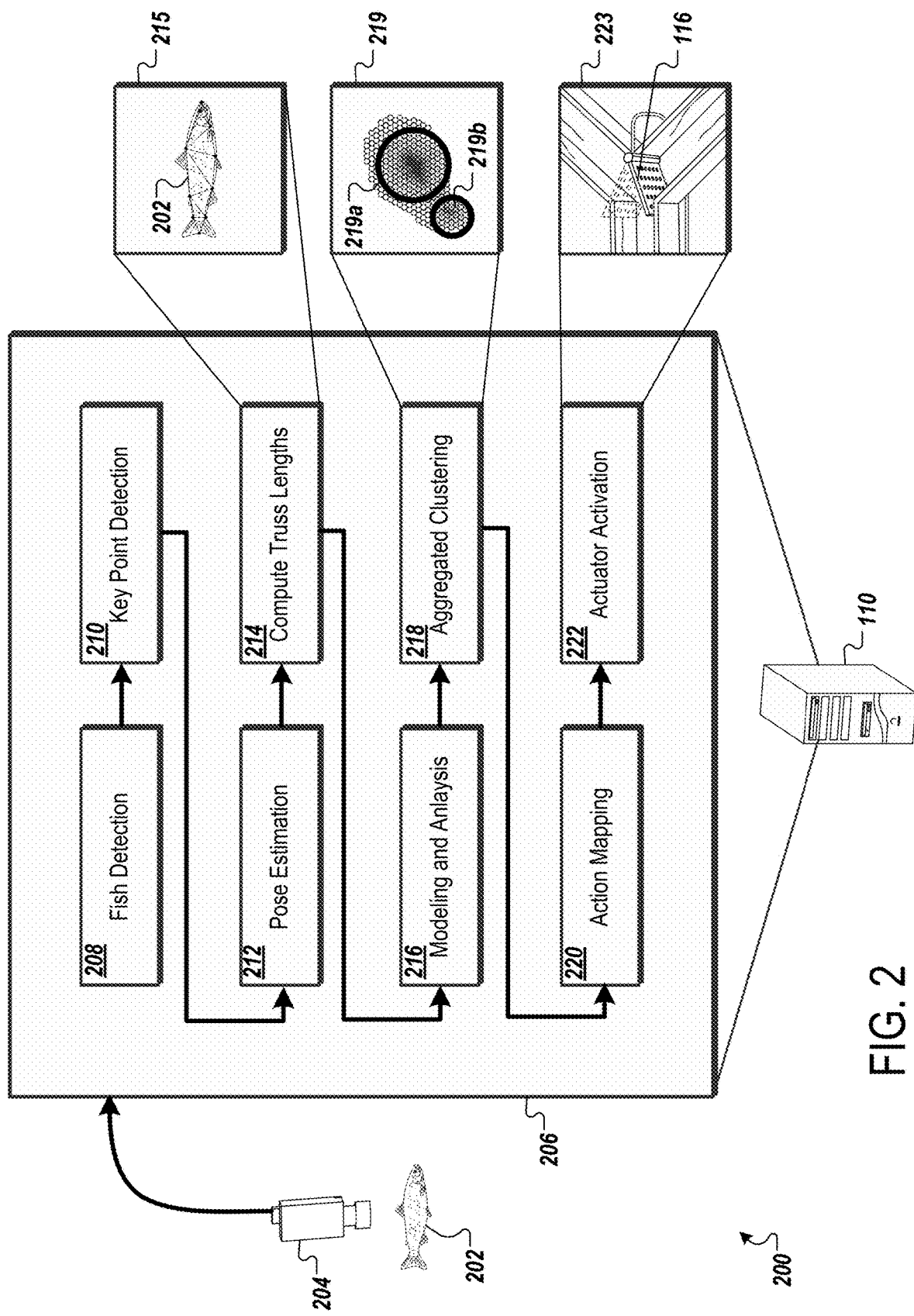
FIG. 2 is a flow diagram showing an example of a system for analysis and sorting in aquaculture.

Stage H shows the control unit 110 receiving one or more images obtained by the imaging device 108 of the healthy fish 106. As mentioned above, the detailed process of the analysis performed by the control unit 110 is shown in FIG. 2. Based on analysis performed, the control unit 110 determines physical characteristics corresponding to the healthy fish 106. For example, the control unit 110 determines that the healthy fish 106 has a weight of 4.3 kilograms (kg) and a length of 14.5 centimeters (cm). Information related to the physical characteristics of each fish within a population of fish is used to generate the population graph 120.

In Stage I, the population graph 120 is generated by the control unit 110 based on the analysis of one or more images obtained by the imaging device 108. The population graph represents population data of the given population with the addition of the recent detection of the healthy fish 106. A database storing information related to members of a population, such as the healthy fish 106, can be updated based on a recent detection or detections. In this case, the detection of the healthy fish 106 is added to the database as an additional data point within an identification profile associated with the healthy fish 106. The identification profile and corresponding data related to the healthy fish 106 can be accessed by a user or automatically by a member of the system 100.

The updated database can be presented to a user or referenced to make automated decisions, such as sorting decisions. The graphical element shown in the population graph 112 and 120 represent two versions of a data visualization tool corresponding to a database that stores information for one or more fish with identification profiles associated with specific identified fish. The data related to the identification profiles can be updated, changed, or referenced by a detection, user input, or other events within the system 100. The data can be presented to the user or used for automated decisions.

Images associated with identified fish can be accessed using a graphical element such as the population graph 120. For example, the image 122 shows an image of the recently detected healthy fish 106. The image 122 also shows information related to the healthy fish. The specific information shown can be any form of gathered or computed information and is not limited in the current specification. In the example of FIG. 1, the image 122 shows the control unit 110 classified the healthy fish 106 as "Healthy". The K-Factor is 1.4 and the weight is 4.3 kg. By selecting an element within the population graph 120, corresponding information, such as the information shown in image 122 can be shown.

A data element corresponding to the healthy fish 106 is generated based on the weight of the healthy fish 106 (e.g., 4.3 kg) and the condition factor or K-Factor (e.g., 1.4). In this case, the data element is used as a coordinate pair to plot a representation of the healthy fish 106 within the population graph 120. One or more previously recorded data elements for other fish can be used to generate the other points within the population graph 120. In some cases, groups of fish can be plotted together within one point.

In some implementations, the data element is generated based on one or more variables within a system. For example, the data element can be a multi-dimensional vector. The multi-dimensional vector can be used within a multi-dimensional plot. Within the multi-dimensional plot, a multi-dimensional clustering algorithm could be used to group subpopulations together. In some cases, instead of weight and condition factor, weight, condition factor, and length are used. Any other measured or perceived value related to a member of the population can be added to the data element. Any value related to the member of the population can be represented as an element within a multi-dimensional vector.

In stage J, the control unit 110 sends a signal to the sorting actuator 116. The data in the signal is based on a location of the healthy fish 106 in the population graph 120, the physical characteristics of the healthy fish 106, and instruction as to where to sort members of the population. In this case, the signal is an instruction for the sorting actuator 116 to close the passage to the second fish pen 118 and allow the healthy fish 106 to progress into the third fish pen 124. The sorting actuator 116 prompts the movement of the flap over the channel connecting the first fish pen 102 to the second fish pen 118 and thus allows the healthy fish 106 to swim through to the third fish pen 124.

As described above, the sorting actuator 116, in this example, is a motorized element activated by the control unit 110 to swing one way or the other depending upon the sorting criteria. The sorting criteria for the system 100 include sorting fish classified as "Runt" into the second fish pen 118 and sorting fish classified as "Healthy" into the third fish pen 124. Stage K shows the healthy fish 106 joining other fish classified as "Healthy" in the third fish pen 124.

FIG. 2 is a flow diagram showing an example of a system 200 for analysis and sorting in aquaculture. The system 200 includes an imaging device 204 that obtains one or more images of the fish 202 and sends the one or more images to the control unit 110. The control unit 110 is used within the system 100 and performs analysis based on the one or more images of the fish 202 or the one or more images and existing data. The existing data is stored in a database accessible by the control unit 110.

The imaging device 204 is a stereo camera that captures one image from one viewpoint of the fish 202, and another image from another viewpoint of the fish 202. Stereo images can be sent to the control unit 110 as part of the one or more images obtained by the imaging device 204. In some implementations, multiple imaging devices are used to obtain one or more images of the fish 202. The multiple imaging devices can be situated at different viewpoints around the fish 202 and can capture different views of the fish 202.

A flow chart shown in item 206 illustrates a number of processing steps and actions performed by the control unit 110. The control unit 110 receives the one or more images of the fish 202 from the imaging device 204 and performs fish detection 208. The fish detection 208 includes the use of a supervised neural network trained on labeled bounding boxes to detect fish using visual data. Boxes labeled as fish are used as a ground truth database to train the supervised neural network to detect objects sharing characteristics with the objects in the labeled bounding boxes, as fish. The supervised neural network, after being trained, is able to take one or more images from the imaging device 204 and generate fish detections and bounding boxes around the fish within an image of one or more fish.

In some implementations, the supervised neural network is a form of convolutional neural network. Various image processing techniques can be used. For example, imaging processing techniques that involve a form of supervised neural network, such as a convolutional neural network, can receive the one or more images of the fish 202 as input. In the case of a convolutional network, various learned filters can be applied to the one or more images. The process of applying a number of filters can be used to detect specific elements, including features on the body of the fish 202, within the one or more images of the fish 202. In some cases, padding on an image can be used to fully capture elements within an image of the one or more images using the given filters within the neural network. Alternative image processing techniques known in the art can also be used to process one or more images.

Figure 3:
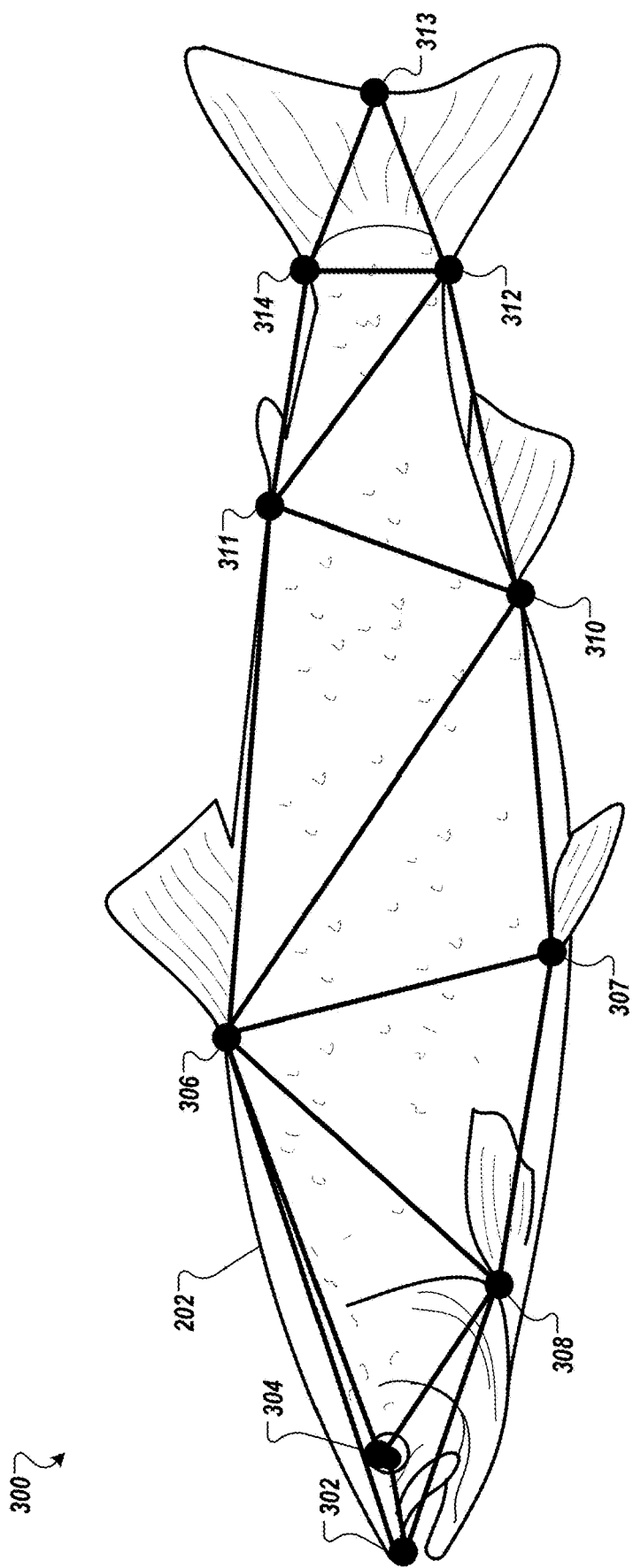
FIG. 3 is a diagram showing an example of a truss network.

In the one or more images processed by the fish detection 208, each fish present in the one or more images is a separate detection of a fish. In the example of FIG. 2, the fish 202 is detected within a section, or sections, of the one or more images obtained by the imaging device 204. A process of key point detection 210 receives data from the fish detection 208 including visual information corresponding to the detection of the fish 202 in the one or more images. The one or more images include images from two or more angles or viewpoints within a stereo pair of images. The key point detection 210 includes a supervised neural network trained using labeled key points on the images of the fish 202. Key points on the body of a fish are shown in FIG. 3 along with truss lengths connecting the key points.

In some implementations, the neural network used to detect the fish is separate from the neural network used to detect key points. For example, the two neural networks can be trained on separate data and a new version of one may be used with an older version of another allowing separate updates to the control unit 110. In other implementations, the detections take place in a single neural network trained to detect fish and key points associated with the fish. For example, a neural network trained using images of labeled fish and key points of the labeled fish can perform the operations of both the fish detection 208 and the key point detection 210. Other consolidations are possible in the control unit 110 process flow. For example, pose estimation may be included in the neural network detecting fish and key points.

Key points on a fish include body parts such as eyes, upper lip, and dorsal fin among others. Specific key points can vary for different species of fish or different animals. Training data containing sections of images labeled as specific key points are used to train the neural network. The trained neural network is used to label unlabeled data as including one or more key points. In some cases, a key point is not detected in a region. In this case, a label indicated no key point is included in the region, or the absence of any label can be used to indicate that no key point is within the region. The unlabeled data is a section of an image including a detection of the fish 202. The key points are determined based on the section of the one or more images containing a detection of the fish 202.

A process of pose estimation 212 receives the detected key points from the key point detection 210. The pose estimation 212 receives key point detections from images including images captured from multiple viewpoints of the fish 202. The multiple viewpoints, and corresponding key points detected in images from the multiple viewpoints, enable the pose estimation 212 to estimate a pose in three dimensions (3D). Key points identified in an image from one viewpoint and an image from another viewpoint are matched and projected into 3D space. The projections of the key points are used to estimate the pose in 3D. In some cases, the projections of the key points are an estimate of the pose in 3D.

A process of computing truss lengths 214 receives information related to the 3D pose estimation and the key points detected on the body of the detected fish. The result of the computed truss lengths is shown in item 215. The fish 202 is shown with truss lengths along its body. A more detailed image of the fish 202 shown in item 215 is discussed in reference to FIG. 3. The truss lengths represent lengths between key points detected on the fish 202.

The pose estimation 212 is used to interpret distances between key points and thus determine truss lengths. For example, key points projected into 3D space can be used to determine various distances associated with the key points. The key points can represent specific locations on the body of a fish. If the fish 202 is at a 15 degree angle from an imaginary line extending from the imaging device 204, locations on the body of the fish 202 may appear close in two dimensions (2D). Projected key points in 3D corresponding to the locations on the body of the fish 202 are used to determine a true distance value by accounting for effects such as the angle of the fish 202 within 3D space. In some cases, other effects including certain camera parameters including lens shape or focal length may affect the apparent distance between the locations on the body of the fish 202. By using pose estimation 212, the 3D pose of the fish is accounted for and accurate measurements of the fish 202 are made.

In some implementations, effects from a visual device alters the obtained one or more images of a fish. For example, the shape of the lens on a camera may distort an image. The distortion of the image may affect the visual appearance of the fish. The true value of one or more truss lengths can be determined by the 3D pose and subsequent truss measurements in 3D. Visual distortions may be alleviated through standard calibration based on known effects on known locations within an image. Similarly, one or more images taken in sequence can be used to determine more accurate values that are affected less by visual artifacts such as lens distortion.

A process of modeling and analysis 216 receives information related to one or more of the previous processing steps including detected fish, detected key points of the detected fish, pose estimations of the detected fish, or computed truss lengths. The modeling and analysis 216 is a linear regression model trained using truss length measurements and corresponding ground truth weight. In some implementations, other algorithms, or processes performed on a computing device can be used to determine weight based on the information of the fish 202. In this way, the modeling and analysis 216 determines a weight of the fish 202 or any other fish detected within the one or more images obtained by the imaging device 204 and processed by the control unit 110.

The modeling and analysis 216 includes computing a K-Factor as one or more values representing weights divided by one or more values representing lengths cubed. The weight, as discussed, has been calculated based on truss lengths obtained from one or more images of the imaging device 204. The traditional approach of manually weighing the fish is significantly slower and can be more prone to mistakes than the current method. In addition, weighing a sufficient quantity of fish in order to generate predictions and sorting is impractical within a traditional manual approach. In the current method, multiple measurements can be made automatically to improve accuracy or check results. Both the lengths and weights can be determined based on the key points and subsequent truss lengths determined based on a 3D pose estimation. The control unit 110 performs the calculation as previously stated and obtains the industry standard K-Factor. Other values can be computed based on the determined physical information corresponding to the fish 202 or additional information can be used to compute additional values.

The modeling and analysis 216 sends information to a database that tracks information corresponding to members of the population. In this case, the detection of the fish 202 can be added to an existing entry corresponding to the identity of the fish 202 or a new entry can be created to hold information related to the fish 202 and the detection. The data, including the computed weight, length, and at least one image of the one or more images, is added to the database.

A process of aggregated clustering 218 uses data within the database that stores information related to members of a population to generate clusters within the population. A graph 219 similar to the population graphs 112 and 120 of FIG. 1, is used to show two clusters 219a and 219b. In the graph 219, weight increases from left to right on the x axis while K-Factor increases from bottom to top on the y axis as shown in FIG. 1. Points on the graph near the top right represent larger fish while points near the bottom left represent smaller fish. As such, the cluster 219a is determined to be healthy while the cluster 219b is determined to be runts or smaller fish. The graph 219 is shown in more detail in FIG. 4.

The fish 202 belongs in the cluster 219b. Corresponding data is sent to action mapping 220. The action mapping 220 uses predetermined criteria to sort the fish 202 based on the physical characteristics and the clustering of the fish 202 with respect to the population. In this case, like FIG. 1, the runts are to be separated from the healthy, larger fish. The action mapping 220 associates a detection of a runt fish with the action of allowing the runt fish to move to a specific location designated for runt fish. The action mapping 220 associates a detection of a healthy fish with the action of allowing the healthy fish to move to a specific location designated for healthy fish.

Based on the action mapping 220, a corresponding actuator activation 222 is performed. In the example of FIG. 1 and FIG. 2, a flap of the sorting actuator 116, as shown in item 223, is used to allow a passage of the fish from one location to another thus sorting the fish. In FIG. 2, the sorting actuator 116 is activated and the fish 202 is blocked from moving through the channel to the third fish pen 124. The fish 202 moves through the other channel to join the other smaller fish in the second fish pen 118.

FIG. 3 is a diagram showing an example of a truss network 300. FIG. 3 shows truss lengths and key points computed for the fish 202 by the system 200 shown in FIG. 2. The truss lengths between key points are used to extract information about the fish including a weight of the fish. Various trusses, or lengths between key points, of the fish can be used. FIG. 3 shows a number of possible truss lengths including upper lip 302 to eye 304, upper lip 302 to leading edge dorsal fin 306, upper lip 302 to leading edge pectoral fin 308, leading edge dorsal fin 306 to leading edge anal fin 310, leading edge anal fin 310 to trailing low caudal peduncle 312, trailing lower caudal peduncle 312 to trailing upper caudal peduncle 314. Other key points and other separations, including permutations of key points mentioned, can be used. For different fish, or different species of fish, different key points may be generated. For any set of key points, a truss network may be generated as a model.

Other truss lengths not shown can be used by the system 200. For example, a truss length from the upper lip 302 to the tail 313 can be used as the length of the fish 202 within the calculation of the K-Factor used in corresponding graphical elements such as the population graph. In addition, specific truss lengths can be used to recognize specific deformities. Deformities such as shortened operculum can be detected using truss lengths such as a truss length from the upper lip 302 to the gill. Processing one or more images of a fish can include determining any of the following health conditions: shortened abdomen, shortened tail, scoliosis, lordosis, kyphosis, deformed upper jaw, deformed lower jaw, shortened operculum, runting or cardiomyopathy syndrome (CMS).

Figure 4:
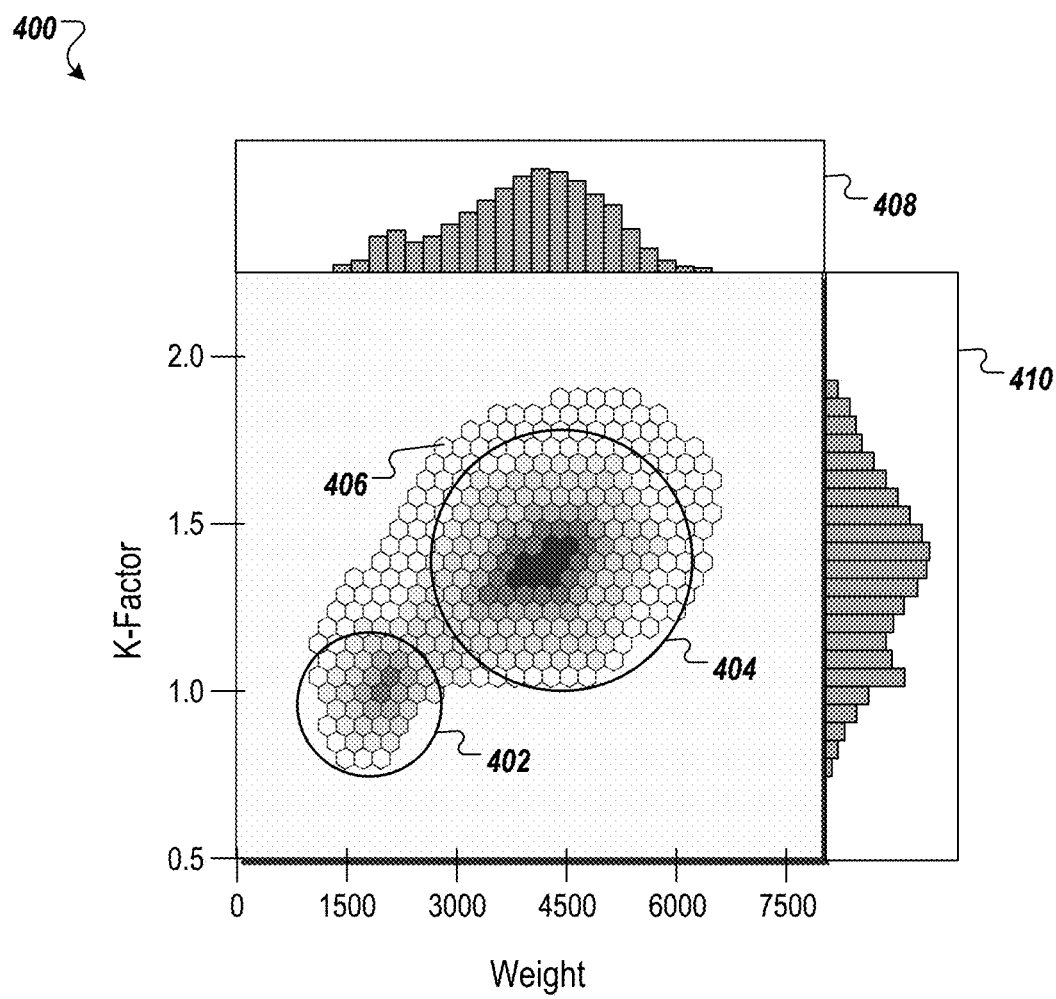
FIG. 4 is a diagram showing an example of a user interface population graph.

FIG. 4 is a diagram showing an example of a user interface population graph 400. As shown in FIG. 1 in population graphs 112 and 120, the weight and K-Factor of a population of fish can be graphically shown to a user. As shown in FIG. 1, each point is associated with a fish or group of fish. And each point includes images of fish. A graphical user interface can be used to interact with points on the graph 400 and show additional information including images or statistical information. The images can be used by users to keep track of certain sections of population. Veterinarians or other health professionals can similarly be alerted to certain sections of the graph 400 as data is updated.

Cluster 402 corresponds to smaller fish or outliers within the population represented by the graph 400. Cluster 404 corresponds to larger fish or normal, healthy fish within the population. An element 406 represents a selection within the population represented by the graph 400. In some implementations, the selection is one fish. In other implementations, the selection is a group of similar fish or similar hatches of fish. Images similar to images 114 or 122 in FIG. 1, can be stored in a database and shown when a user clicks or otherwise selects an element such as the element 406. Other visual elements or modifications can be a part of a population graph. For example, as shown in the example of FIG. 4, histograms 408 and 410 show additional information related to the population detailing the number of fish corresponding to the shaded colorings of the elements within the graph 400. What information is displayed as well as the way in which information is displayed can be modified by a user or other system admin.

In some implementations, feeding behavior or movement within the pen for members within a population can be recorded and used for analysis. For example, if a number of fish are not feeding in normal areas, not feeding at regular intervals, or not feeding to a sufficient degree, related tracked information can be recorded and attached to the specific fish or multiple fish.

In some implementations, other parameters can be used to generate specific clusters or graphs. For example, sea lice can be detected on a number of fish within a fish population. The graph can include the number of sea lice a fish is infected with related to another health metric such as K-Factor. Other combinations are possible and can be tailored by users or generated in response to one or more received detections. For example, multiple detections of a specific disease can result in a generation of a graph showing the effect of the disease within the population. Dynamically generated graphs can help orient users to issues within a population before other outward signs within a population become visible.

In some implementations, yield predictions can be generated based on observing one or more fish within a population. For example, within a first pen, ten fish may be detected. Corresponding data related to the detections of the ten fish can be used to compare the ten fish with other similar pens. Similar groups of fish can be used to generate predictions. For example, historical data can be used to compare the ten fish within the first pen to a similar group of fish detected previously. A given group of fish can be matched with a similar group of fish. A yield associated with the historical data of the similar group of fish detected previously can be used to predict the yield of the ten or more fish in the first pen. In other implementations, any number of fish can be used to compare with historical data in order to generate a yield prediction for members of a population. The yield predictions can be used for business purposes or decision making including sorting members of a population, preparing one or more fish for market, predicting revenue, among others.

Figure 5:
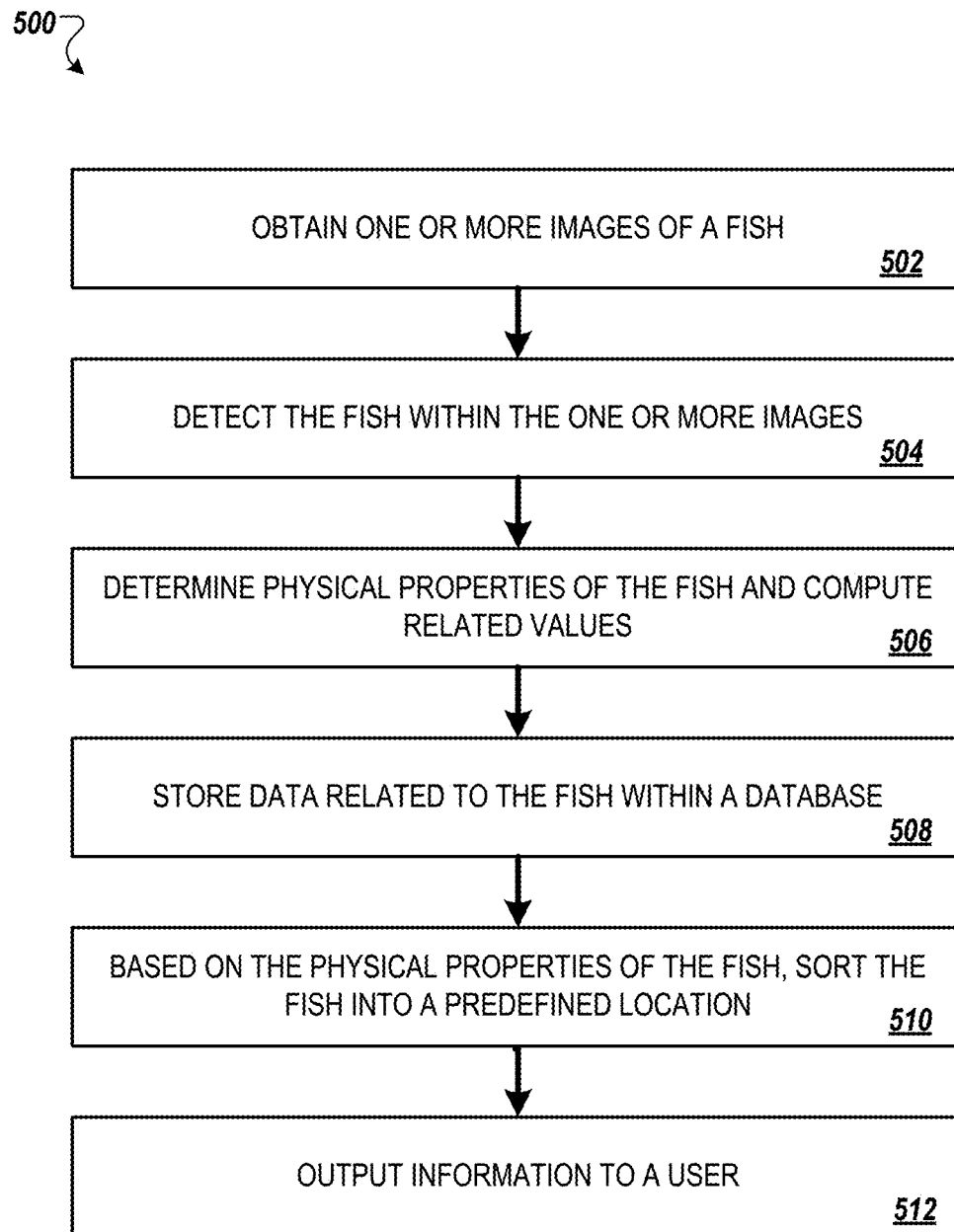
FIG. 5 is a flow diagram illustrating an example of a process for analysis and sorting in aquaculture.

FIG. 5 is a flow diagram illustrating an example of a process 500 for analysis and sorting in aquaculture. The process 500 can be performed by one or more electronic systems, for example, the system 100 shown in FIG. 1 or the system 200 shown in FIG. 2.

The process 500 includes obtaining one or more images of a fish (502). For example, the imaging device 108 can obtain one or more images of the runt fish 104 as the runt fish moves from the first fish pen 102 to the channel connecting the first fish pen 102 to the second fish pen 118 and the third fish pen 124. The imaging device 108 can be a form of digital camera or a set of multiple digital cameras.

The process 500 includes detecting the fish within the one or more images (504). For example, the control unit 110 can detect the runt fish 104 using a neural network that processes one or more images. The one or more images can be obtained from the imaging device 108 after a motion sensor detects movement corresponding to the runt fish 104.

In some implementations, the control unit 110 performs analysis as described in reference to FIG. 2 involving one or more machine learning models, neural networks, or algorithms to analyze the one or more images of the fish 202. A neural network can be used to detect one or more fish within an image containing one or more fish. A bounding box or other signifier can be used to designate one or more fish within one or more images as detected. The sections corresponding to the one or more bounding boxes used to detect one or more fish can be used as images of corresponding fish.

The process 500 includes determining physical characteristics of the fish and computing related values (506). For example, in FIG. 2, the modeling and analysis 216 within the control unit 110 receives truss lengths determined based on the one or more images and additional processing steps described in reference to FIG. 2. The modeling and analysis 216 determines weight based on the truss network measurements received as data. The process of generating a weight from the truss networks can be a form of neural network or machine learning trained to take truss lengths and compute weights based on the determined truss lengths.

The process 500 includes storing data related to the fish within a database (508). For example, the control unit 110 can be communicably connected to one or more electronic storage devices. The electronic storage devices can store data related to one or more members of the population within a database. The database can be used to generate population graphs as shown in item 219 of FIG. 2. The database can be updated through one or more additional detections or modified by a manual detection or modification to the system. In some cases, the database can be stored within a system communicably connected to the system 100 of FIG. 1.

The process 500 includes based on the physical characteristics of the fish, sorting the fish into a predefined location (510). For example, the control unit 110 classifies the runt fish 104 as "Runt" and according to the predefined sorting criteria for the system 100, the control unit 110 sends a signal to the sorting actuator 116 to allow passage for the runt fish 104 to the second fish pen 118. The control unit 110 can use data from the population, as shown in the population graph 112, to determine where to sort the runt fish 104.

The process 500 includes outputting information to a user (512). For example, the control unit 110 can output data corresponding to a graphical element similar to 112 or 120, such as the population graph 400 in FIG. 4, to an external element such as a display or other electronic device including portable electronic devices such as smartphones or tablets. The electronic devices can render the data graphically as shown in FIG. 4. System configuration tools can be used to display certain kinds of information related to the population as well as to modify the visual details of information displayed. For example, the population graph 400 of FIG. 4 can be shown with or without added histograms 408 and 410. Different visual styles of graph can be used and alternate sources of data can be represented compared to the graph 400.

In some implementations, multiple sightings of a fish are aggregated together in a database. For example, multiple sightings of a fish in one pen and the same fish in another pen, in cases where fish move from pen to pen, can be stored. Information, including images of the fish, corresponding locations of the images, current location of the fish, or last known location, can be recorded. Other data, such as condition factor, disease, skeletal deformity including spinal deformity, among others, can also be recorded.

In some implementations, a subset of obtained images corresponding to a fish is recorded. For example, images of a fish that feature the fish unobstructed or in other ways are clear, and without visual defects in the region of a detection of the fish, can be aggregated together. The aggregated images of the fish can be used to form video from which behavior clues can be devised. The behavioral cues can be used to further record a current mental state or infer other non-visual traits of the fish including non-visual disease symptoms. In some cases, behaviors associated with a fish can be determined based on the aggregated images of the fish. The behaviors can be used to aid in the determination of diseases or other automated processes including predictions or sorting.

In some implementations, clusters or groups within a population are tracked to infer information related to the cluster or group. For example, smaller sized fish in a population can be recorded or tracked. Data related to the smaller sized fish can be used to inform understandings of causes or enable automatic preventative measures such as moving fish away from a certain pen or location that is correlated with stunted growth possibly because of a chemical leak, environmental factors including water temperature or water quality among others, or other external influence. By gathering data on a population, understandings can be generated and used to better manage the population or generate predictions including yield or profit.

In some implementations, sorting the fish can be accompanied by other processes. For example, a fish with sea lice can be sorted into a location with an automated delouse machine that can delouse the fish. Similar sorters in other pens or locations can similarly sort the fish back into specific pens after the lice have been removed. Similar actions can be performed for other diseases or ailments.

In some implementations, sites can be flagged based on recorded data of a population. For example, boats moving between fish pens can spread disease between pens. If a number of fish are ill within a specific pen, the site can be flagged and boats and other spreaders of disease, like humans, other animals, machines, or instruments, can be prevented from going to the flagged site or, if there, can be prevented from leaving without first disinfecting or taking other preventative measures. In one example, the control unit 110 can send a signal to a fleet of boats with a location of the flagged site as a "flagged site" alerting boats not to move in that region.

In some implementations, other sorting criteria are used. For example, instead of sorting fish classified as "Runt" from fish classified as "Healthy", a system can sort fish with specific deformities from fish that do not have physical deformities. Physical deformities can be detected based on certain truss lengths determined by the control unit 110. Clustering based on fish sharing the characteristics of specific deformities or one or more deformities including scoliosis or lordosis among others, can be used to sort particular fish with deformities from fish without deformities.

In some implementations, fish with diseases are detected. For example, the control unit 110 can detect sea lice on a fish. The detection of sea lice on a fish can be an additional data element stored within a database. Fish with the disease of sea lice can be detected and sorted from fish that do not have the disease of sea lice. In general, any disease can be used as criteria for the control unit 110 to sort a given population.

In some implementations, the control unit 110 interprets elements within an image that are not visible. For example, if another fish swims between the imaging device 204 and the fish 202 while the imaging device 204 is capturing one or more images of the fish 202, the other fish may obscure or cover up portions of the fish 202. For example, the other fish may be obscuring the tail of the fish 202. In this example, the control unit 110 can, based on knowledge of a shape of a fish, species, or animal, infer that the tail should be at a specific location at the opposite end of the head and equidistant from the dorsal fin. In some cases, proportions of other elements of the animal or fish can be used to determine likely locations or proportions of other elements that may not be visible.

In some implementations, images determined to be not useful of a fish can be disregarded or discarded. For example, if in the example given above, the other fish covers the entire body of the fish 202 except for the tail, the image of the fish 202 can be discarded or disregarded as lacking sufficient data to interpret information of the fish 202. Similarly, if the fish 202 is at an extreme angle to an imaging device, a resulting image with multiple key points stacked, or too close to one another can be used to determine that a certain image should be discarded or disregarded. Obscurities from optical elements, such as smudges or lens cracks, or digital data corruption can similarly be sufficient to disregard or discard.

In some implementations, a score representing an indication of the quality of an image is used to determine whether an image is used for analysis or sorting. For example, in the examples discussed above, if the other fish covers the entire body of the fish 202 except for the tail, the quality score can be a low value indicating poor quality. Various scoring systems and ranges can be used. On the other hand, if an image is captured with the fish and exactly a 90 degree angle as shown in item 215 of FIG. 2, the quality indicator can be very high indicating superior quality. In some cases, when determinations from multiple images are in conflict, determinations made from images with high quality scores can be used over determinations made from images with lower quality scores.

In some implementations, the imaging device 204 includes a depth sensor to enable 3D pose estimation. For example, images obtained by the imaging device 204 include depth information from the depth sensor on the imaging device 204. The pose estimation 212 determines a 3D pose of the fish 202 based on the depth sensor information obtained by the imaging device 204. In this way, stereo images of the fish 202, images from two or more viewpoints of the fish 202 are not used for 3D pose estimation. In some cases, the depth sensor can be a form of sonar or structured light.

In some implementations, the control unit 110 performs a subset of the processes depicted in FIG. 2. For example, the control unit 110 may perform operations including aggregated clustering 218. The control unit 110 can then not perform the actuator activation 222 based on a given action mapping 220. In some cases, the action mapping 220 stipulates no action be taken. In other cases, only aggregated clustering is performed and resulting data is stored in order to maintain a database of information and corresponding graphical elements depicting a given population.

In some implementations, image analysis performed may be composed of multiple steps. For example, the image analysis performed by the control unit 110 in the fish detection 208 step, may include a rough object identifier used to detect the fish 202 within the one or more images. A second object identifier may be the key point detection 210 process and may include receiving the output of the first object identifier to locate objects on the fish 202 including key points of the fish. The multiple steps can be performed by various computational methods including, but not limited to, algorithms, neural networks, or linear regressions.

In some implementations, one or more images obtained by an imaging device contain two or more fish. For example, the imaging device 108 can capture images of both the runt fish 104 and the healthy fish 106. Image processing performed by the control unit 110 can be used to identify the runt fish 104 and the healthy fish 106 within one or more images containing both the runt fish 104 and the healthy fish 106. Sections of the one or more images that contain the runt fish 104 can be used as images of the runt fish 104. Similarly, sections of the one or more images that contain the healthy fish 106 can be used as images of the healthy fish 106. In general, this approach can be applied to any number of fish within a view of an imaging device or multiple imaging devices.

In some implementations, the imaging device 108 obtains one or more images of the healthy fish 106 without a signal from the motion detector. For example, the imaging device 108 can capture one or more images and send the one or more images to the control unit 110. By performing image detection on the one or more images, the control unit 110 can determine images of the healthy fish 106.

In some implementations, the motion detector or other element is used to send a control signal to the imaging device. For example, if the motion detector detects movement, the motion detector can send a signal to the imaging device and, responsive to receiving the signal from the motion detector, the imaging device 108 can increase the frequency of images obtained.

In some implementations, other sorting criteria is used. For example, instead of separating members classified as "Runt" into one area and members classified as "Healthy" into another area, the system 100 can be used to separate those determined to be sick or otherwise unwell from members of the population that are not sick or are well. Determinations based on one or more images collected by the system 100, the imaging device 108, and processed by the control unit 110 can be used to classify fish as well or unwell. Based on the determination, the control unit 110 can either automatically sort the unwell fish from the well fish or flag certain fish for sorting by an external system. The identification abilities of the control unit 110 can be used to identify and therefore aid in any form of population segmentation.

In some implementations, the sorting actuator 116 is another form or element. For example, instead of the flap shown in FIG. 1, the sorting actuator can be a drop down mechanism where objects are lowered to block a passage and raised to allow passage from one area to another based on a given sorting criteria. In some cases, water flow can be used to sort one or more fish. Increased water flow can be used to maintain a fish in one location or incentivize a given location over another in an attempt to sort the fish into the given location over the other.

In some implementations, the sorting actuator 116 includes a closing or opening mechanism. For example, the closing mechanism can include an element similar to an iris of a human eye. The element can be used to restrict the size of a passage to only allow certain members of a population through. Other shapes may be used or generated to accomplish similar goals. A benefit of using an actuator to create the shapes for members of a population to move through is the ability to change the kind of shape dynamically through the use of a computer or other controller such as the control unit 110.

In some implementations, the sorting actuator 116 includes a linear actuator. For example, instead of swinging to the left or right depending on a sorting decision, the sorting actuator 116, or element attached to the sorting actuator 116, can move linearly left or right, up or down, to alternately block or open passage from one area to another area.

In some implementations, the control unit 110 is used to establish sorting decisions based on a sorting criteria. For example, the sorting decisions can be generated based on determined characteristics of a fish and corresponding sorting criteria for a system. The sorting decisions can be sent to a user or owner of a system for external involvement not carried out directly by the control unit 110. For example, instructions based on the sorting decision can be sent to a worker within an aquaculture environment. The worker can manually sort an identified fish into a given location based on the sorting decision determined by the control unit 110. In some cases, the control unit 110 can automatically sort animals, such as the runt fish 104 in FIG. 1 and also produce a sorting decision to be carried out by an external system. In some cases, animals not able to be automatically sorted can be identified as requiring sorting by external systems or certain external systems.

In some implementations, one or more other images are captured by the imaging device 108. For example, instead of using a motion sensor, the imaging device 108 can capture one or more images and send the one or more images to the control unit 110. The control unit 110 analyzes the one or more images and, based on the analysis, determines whether or not a fish is in view and thus whether or not a fish is present in the viewing area of the imaging device 108. In this way, image recognition of fish within images obtained by the imaging device 108 can be used to replace or supplement any existing motion sensor.

In some implementations, the imaging device 108 includes multiple sub elements. For example, the imaging device 108 can be a form of an imaging assembly comprised of one or more cameras, storage devices, or other electronic components. The imaging device 108 can be capable of capturing images of an object from two or more viewpoints to aid in 3D analysis including pose estimation.

In some implementations, other storage devices are used to store fish. For example, instead of the first fish pen 102, the runt fish 104 can be stored in an open water environment. The open water environment can similarly be connected to one or more other areas used for fish storage. A sorting actuator can be used to control access to the one or more other areas used for fish storage. In general, any element able to store aquatic animals, including fish, can be used in place of the first fish pen 102 of FIG. 1. Similarly, any element able to store aquatic animals can be used in place of the second fish pen 118 or the third fish pen 124.

In some implementations, more than two elements can be used to sort animals into. For example, instead of two elements in the second fish pen 118 and the third fish pen 124, three elements can be used. A sorting actuator can be used to sort fish, or other items into one of the three elements.

In some implementations, instead of fish, other animals can be sorted. For example, other forms of aquaculture or forms of non-aquaculture may be similarly sorted using a system similar to the system 100. Cattle raised in pastures may be similarly sorted into separate fields or tagged for further processes based on visual processing by a control unit similar to the control unit 110 of FIG. 1 and FIG. 2. In general, the method and devices discussed in this specification can be applied in any instance in which sorting can be performed based on analysis of members of the population. Analysis can be used to inform a user as well as to inform subsequent action such as the sorting discussed with detail in this specification.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
generating images of farmed fish within an enclosure using an underwater camera;
for each of the images, applying a machine learning-trained model to features of the image to generate a biomass estimate for a farmed fish within the image;
generating a distribution that indicates, for each of multiple biomass values, a count of the farmed fish whose respective generated biomass estimate is associated with the biomass value; and
generating a recommended feeding amount for the farmed fish within the enclosure based at least on the distribution.

2. The method of claim 1, wherein the underwater camera comprises a stereo camera.

3. The method of claim 1, comprising transmitting an instruction to a feeder based on generating the recommended feeding amount.

4. The method of claim 1, wherein the distribution comprises a histogram.

5. The method of claim 1, wherein each of the multiple biomass values represents a range of weights.

6. The method of claim 1, comprising estimating a quantity of runt fish within the enclosure based on the distribution.

7. The method of claim 1, comprising training the model based on features of other fish.

8. A non-transitory, computer-readable medium storing one or more instructions executable by a computer system to perform operations comprising:
generating images of farmed fish within an enclosure using an underwater camera;
for each of the images, applying a machine learning-trained model to features of the image to generate a biomass estimate for a farmed fish within the image;
generating a distribution that indicates, for each of multiple biomass values, a count of the farmed fish whose respective generated biomass estimate is associated with the biomass value; and
generating a recommended feeding amount for the farmed fish within the enclosure based at least on the distribution.

9. The medium of claim 8, wherein the underwater camera comprises a stereo camera.

10. The medium of claim 8, wherein the operations comprise transmitting an instruction to a feeder based on generating the recommended feeding amount.

11. The medium of claim 8, wherein the distribution comprises a histogram.

12. The medium of claim 8, wherein each of the multiple biomass values represents a range of weights.

13. The medium of claim 8, wherein the operations comprise estimating a quantity of runt fish within the enclosure based on the distribution.

14. The medium of claim 8, wherein the operations comprise training the model based on features of other fish.

15. A computer-implemented system comprising:
one or more computers; and
one or more computer memory devices storing one or more instructions that, when executed by the one or more computers, perform one or more operations comprising:
generating images of farmed fish within an enclosure using an underwater camera;
for each of the images, applying a machine learning-trained model to features of the image to generate a biomass estimate for a farmed fish within the image;
generating a distribution that indicates, for each of multiple biomass values, a count of the farmed fish whose respective generated biomass estimate is associated with the biomass value; and generating a recommended feeding amount for the farmed fish within the enclosure based at least on the distribution.

16. The system of claim 15, wherein the underwater camera comprises a stereo camera.

17. The system of claim 15, wherein the operations comprise transmitting an instruction to a feeder based on generating the recommended feeding amount.

18. The system of claim 15, wherein the distribution comprises a histogram.

19. The system of claim 15, wherein each of the multiple biomass values represents a range of weights.

20. The system of claim 15, wherein the operations comprise estimating a quantity of runt fish within the enclosure based on the distribution.

* * * * *